May 4, 1926.
J. A. JENSEN
TANK VEHICLE
Filed July 21, 1924
1,583,556
3 Sheets-Sheet 1
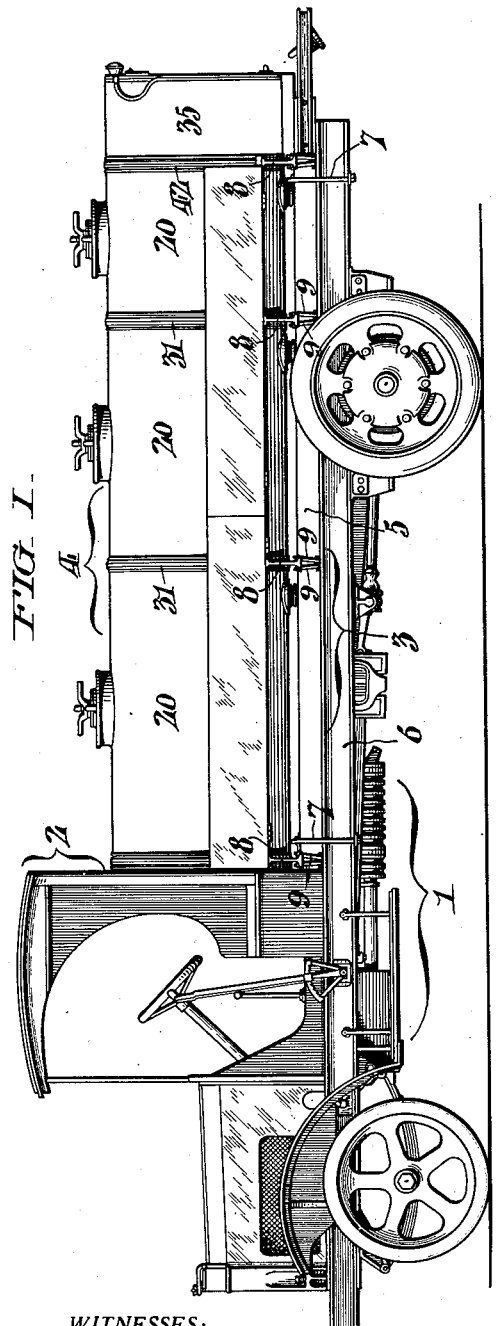
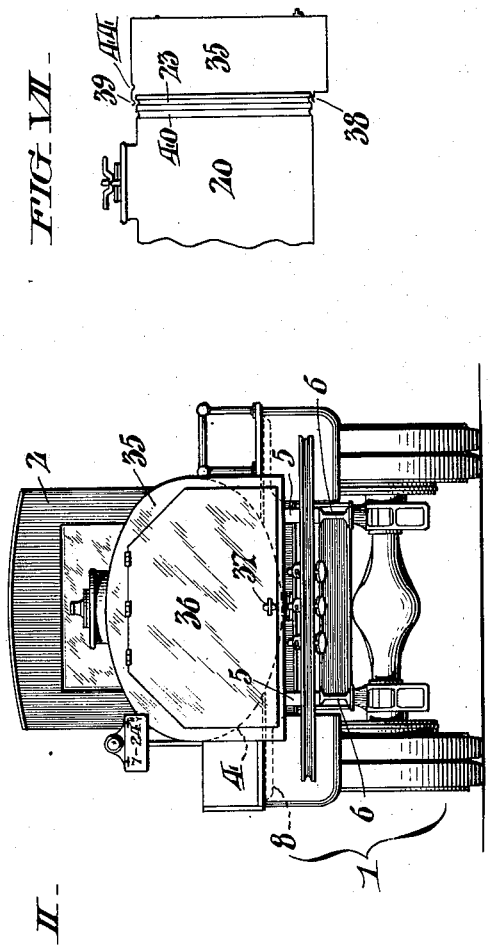
INVENTOR:
James A. Jensen,
BY Fraley & Paul
ATTORNEYS.

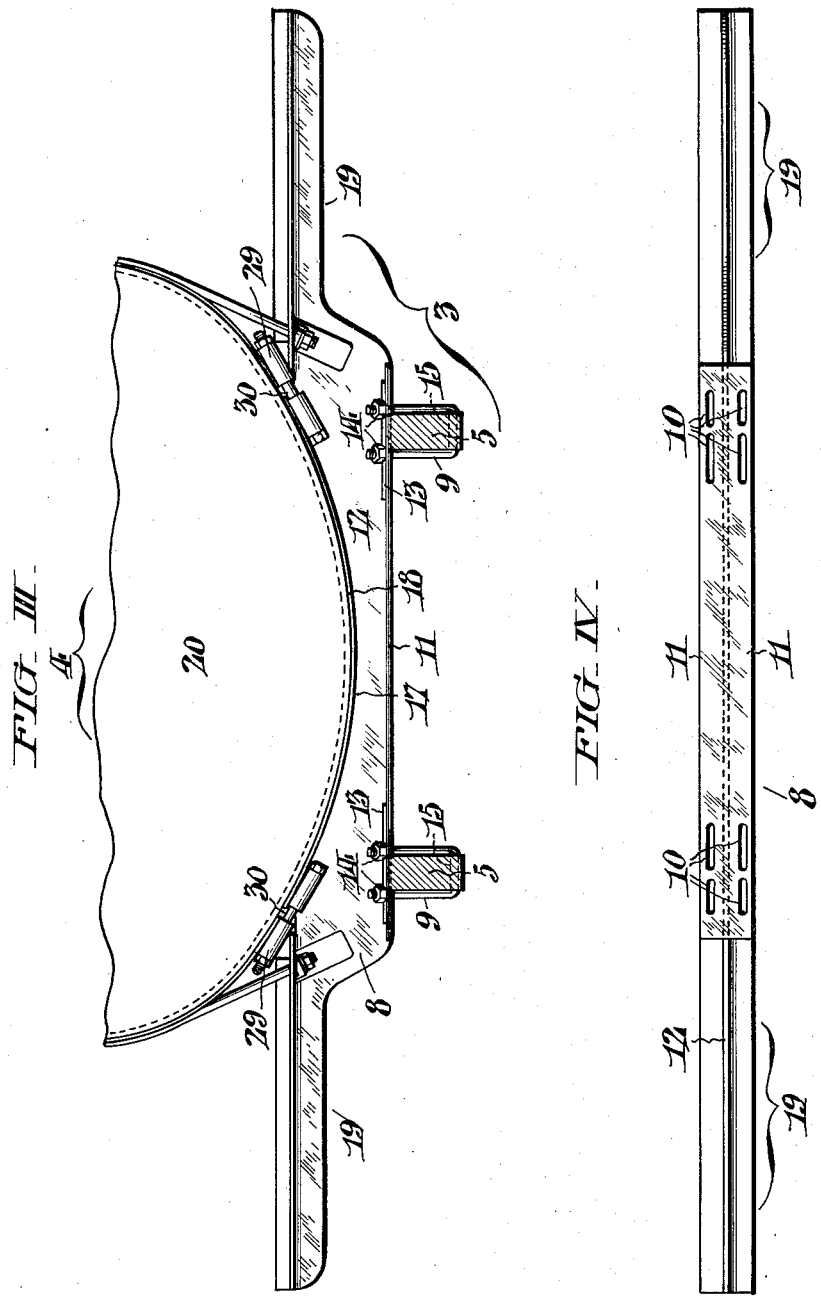

May 4, 1926.　　　　　　J. A. JENSEN　　　　　1,583,556
TANK VEHICLE
Filed July 21, 1924　　　3 Sheets-Sheet 3
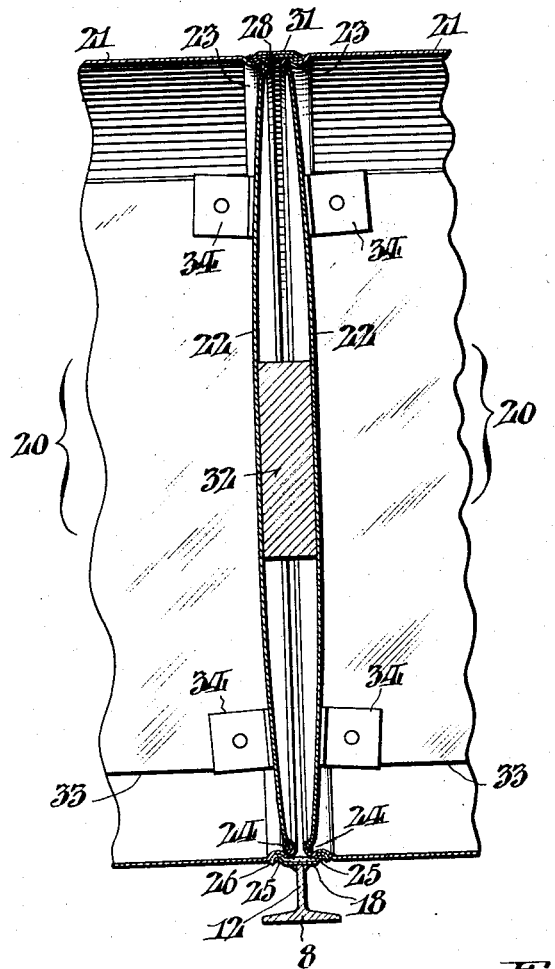
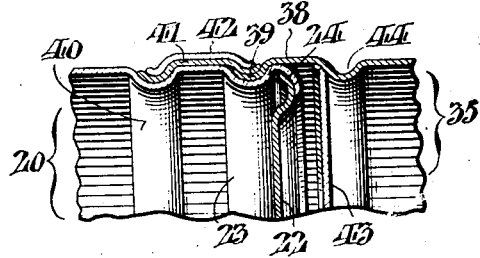
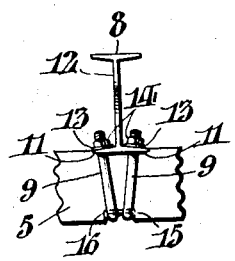
WITNESSES:
Alfred E. Ischinger
John C. Bergner
INVENTOR:
James A. Jensen,
BY Fraley Paul
ATTORNEYS.

Patented May 4, 1926.

1,583,556

UNITED STATES PATENT OFFICE.

JAMES A. JENSEN, OF PHILADELPHIA, PENNSYLVANIA, ASSIGNOR TO QUAKER CITY IRON WORKS, OF PHILADELPHIA, PENNSYLVANIA, A CORPORATION OF PENNSYLVANIA.

TANK VEHICLE.

Application filed July 21, 1924. Serial No. 727,193.

*To all whom it may concern:*

Be it known that I, JAMES A. JENSEN, a citizen of the United States, residing at Philadelphia, in the county of Philadelphia and State of Pennsylvania, have invented certain new and useful Improvements in Tank Vehicles, whereof the following is a specification, reference being had to the accompanying drawings.

This invention relates to tank vehicles of the automobile type ordinarily employed in transporting and vending fuel oils, lubricating oils, or other fluid commodities, and wherein the tanks are usually composed of a series of separate units which are secured to one another, and the whole lashed to the wheeled support or chassis of the vehicle.

My invention is directed to structural improvements calculated to insure the tank sections against relative displacement, also from shifting with respect to the wheeled support; as well as to other details contributing to render the tank sections capable of better withstanding both the severe shocks attending the travel of the vehicle over rough roads, and the strains induced by the surging of the contents, without yielding to fracture or opening of the junctures between their component parts.

The advantages accruing to my invention will become readily apparent from the detailed description hereinafter of a typical embodiment thereof, the appended claims serving to define those features which I believe to be novel and wholly within the scope of the present improvements.

With reference to the drawings, Fig. I is a side elevation of a tank vehicle wherein the novel features of my invention are incorporated.

Fig. II is a rear elevation of the same.

Fig. III is a fragmentary detail view showing in cross section, the cradle frame whereon the tank is mounted.

Fig. IV is a bottom plan view of one of the transverse beams of said cradle frame.

Fig. V is a detail cross sectional view showing certain structural details of adjacent tank units and the manner in which said units are joined together.

Fig. VI is a detail illustration showing the means employed in securing the transverse members of the cradle frame to its longitudinals or sill rails.

Fig. VII is a diagrammatic detail view showing the manner of securing a storage box to the cradle frame in alignment with the tank; and Fig. VIII is a fragmentary detail sectional view, on a larger scale than the preceding, showing the juncture between said box and the tank to better advantage.

As shown in Figs. I and II, the complete vehicle organization comprises a wheeled support in the form of an automobile chassis 1 which may be of any standard or approved design and construction. Superposed on the frame of the chassis 1 directly to the rear of the housing 2 for the driver, is an auxiliary frame comprehensively indicated at 3 that serves as a cradle whereon the tank 4 is directly mounted. More especially from Figs. I and III it will be observed that this cradle mounting 3 comprises a pair of sill rails 5—5—preferably of timber—adapted to rest respectively upon the side rails 6—6 of the chassis frame and rigidly secured to the latter by a number of embracing strap bolts 7. The cradle frame 3 further comprises a series of transverse beams 8 allocated at suitably spaced intervals lengthwise of the sill rails 5, and formed from standard structural iron of I cross section altered as hereinafter noted. As a means for securing the transverse beams 8 to the sill rails 5 of the cradle frame 3, I employ U-bolts 9 in cooperative pairs, said bolts embracing the sill rails 5 and having their ends projecting through slots 10 in the bottom flanges 11—11 of the transverse beams 8 at opposite sides of the central webs 12 of the latter, and washer plates 13 interposed beneath their securing nuts 14 to cover said slots, see Fig. VI. The U-bolts 9 thus function not only as the securing means, but act to prevent splitting of the wood, and should the latter contingency occur, serve to hold the split parts together. Furthermore, the U-bolts 9 bear against three sides of the wood sills 5, and thus prevent them from rocking in a direction laterally of the vehicle and with respect to the transverse beams 8. As shown in Figs. III, VI, the sill rails 5 are notched at the bottom as at 15 to accommodate the cross or connecting portions of the U-bolts 9, the notches being lined with inserts 16 of channel iron which protect the wood from wearing away or crushing. The component bolts 9 of each pair are purposely pitched coplementarily to the vertical as shown so as to better oppose displacement of the transverse beams 8 relative to the longitudinals 5. This contingency is further guarded against by recessing the sill rails slightly to receive the base flanges 11 of the transverse beams 8, see Fig. VI. By provision of the slots 10 in the bottom flanges 11 of the transverse beams 8, the cradle frame 3 may be adjusted to adapt it to chassis frames of various widths. This adjustment will also permit shifting of the transverse beams 8 relatively to the sill beams 5 and thereby facilitate mounting of the tank 4 on said frame. The upper flanges and the vertical webs 12 of the transverse beams 8 are cut away at the center as shown at 17 in Fig. III, the cuts being curved to correspond to the cross-sectional configuration of the tank 4, which in the instance shown, is oval or elliptical. The edges of the bights thus formed in the beams 8 are topped by arcuate segments 18 secured in a central position relatively to the webs 12, preferably by welding. The transverse beams 8 are, moreover, reduced at their extremities as at 19—19 leaving ends of T-cross section that are sufficiently strong to serve as out-rigger arms for sustaining side platforms which are usually employed to carry other varieties of the fluid commodities in cans and the like.

The tank 4 is not an integral structure, but is composed of a number of separate axially aligned units or sections 20—20, each complete in itself and comprising a tubular shell 21, and attached closure heads 22 which are inwardly dished as shown in Fig. V to better withstand lateral thrusts. Adjacent their ends, the shells 21 are provided with inwardly rolled beads 23 which afford internal shoulders against which the heads 22 seat; and the ends of the shells 21 are lapped over circumferential beads 24 of the heads 22, thereby to hold the latter in assemblage. Fluid tightness as well as greater rigidity of the tank units 20 may be had by welding the shells 21 and the heads 22 together along the junctures between them. In mounting the tank units 20 upon the cradle frame 3, the same are arranged in abutting relation as shown in Figs. I and V, and the contiguous abutting ends are in each instance supported jointly by one of the transverse beams 8 of the cradle frame 3, the arcuate segments 18 of which are formed with edge beads 25 adapted to fit the external troughs of the beads 23 of said units. Gaskets 26 of felt or other suitable yielding material, are interposed at the regions just described to cushion the tank ends, and to compensate for any irregularities in them. The units 20 are secured together by straps 28 with edge beads to fit the grooves 23 of the tank units like the arcuate segments referred to of the transverse beams 8 and constituting complements of the latter, see Fig. V. At the ends, the straps 28 are provided with ears 29 for passage of tie bolts 30 which are appropriately anchored at opposite sides of the transverse beams 8 as shown in Fig. III. Supplemental straps 31 engaging over the straps 28 and tied to the transverse beams 8 as shown in Fig. III, afford additional means for securing the tank units 20 to the cradle frame 3. These tank units 20 are thus effectively tied to each other and lashed to the cradle frame 3 in a manner which will insure them against shifting and yet allow sufficient flexibility to avoid fracture or opening of their seams under vibrations imparted during travel of the vehicle.

In the intervals or hollows jointly formed by the inwardly-dished heads 22 of adjacent tank units 20, I insert filler pieces 32 (see Fig. V) preferably of non-rigid material such as wood, these to serve as spacers and to strengthen the heads 22 against surging of the tank contents, the latter contingency being offset in a lateral direction by baffle plates 33 extending longitudinally between the heads of the respective units and secured thereto by wing plates 34.

To the rear end of the tank 4 is appended a box 35 designed for use as a storage compartment for measuring vessels or other accessories needed in dispensing the fluid commodities, said box being accessible through an upwardly-swingable door 36, (see Fig. II), normally held closed by a suitable catch shown at 37. The box 35 is generally rectangular in cross section, having straight sides and bottom, its top being, however, curved or arched in correspondence with the tank 4. At the inner end, the box 35 has an integral laterally-extending annular flange 38 adapted to fit about the contiguous end of the rearmost of the tank units 20, see Fig. VII. The flange 38 is circumferentially beaded as at 39, see Fig. VIII, to interengage with the perimetric recess 23 of the rear-most tank unit 20, and the latter is provided with an additional recess 40 so that a strap 41 similar to the straps 28 may be employed in securing said unit and the box continuously together. A second or supplemental strap 42 is also employed to lash the unit and the box to the cradle frame 3. The rear head 22 of the rear-most tank unit 20 is concealed and protected by a plate 43 which forms the back wall of the box 35, said plate being secured by welding or otherwise against an internal shoulder 44 formed by a bead in the wall of said box.

Having thus described my invention, I claim:

1. In a tank vehicle including a wheeled support, an auxiliary frame providing a cradle for the tank, said auxiliary frame comprising longitudinal sill rails and a series of spaced transverse structural beams having bottom flanges seating in recesses on the top of the said sill rails, and securing means in the form of U-bolts embracing the sill rails and passing through elongated slots in the base flanges of the transverse beams, the cross portions of said U-bolts being accommodated in notches at the bottom of the sill rails to permit relative adjustment of said rails and beams in suiting the cradle frame to the wheeled support, as well as affording compensative adjustment for the beams to facilitate mounting of the tank on the frame.

2. In a tank vehicle including a wheeled support, an auxiliary frame providing a cradle for the tank, said frame comprising longitudinal sill rails and a series of interengaging transverse I-beams, and securing means in the form of U-bolts cooperating in pairs to embrace the sill rails and to engage opposite sides of said beams, the components of each pair of U-bolts being oppositely inclined so as to brace the transverse beams against thrusts in a direction fore and aft of the vehicle.

3. In a tank vehicle including a wheeled support, an auxiliary frame providing a cradle for the tank, said frame comprising longitudinal sill rails and a series of transverse I-beams having the bottom flanges seating in recesses at the top of the sill rails, and securing means in the form of U-bolts cooperating in pairs to embrace the sill rails and engage the base flanges of the transverse beams at opposite sides of the vertical webs, the cross portions of said U-bolts being accommodated in notches at the bottom of the sill rails, and the components of each pair of U-bolts being oppositely inclined so as to brace the transverse beams against thrust in a direction fore and aft of the vehicle.

In testimony whereof, I have hereunto signed my name at Philadelphia, Pennsylvania, this 17th day of July 1924.

JAMES A. JENSEN.